US012202472B2

(12) United States Patent
Young et al.

(10) Patent No.: US 12,202,472 B2
(45) Date of Patent: Jan. 21, 2025

(54) APPARATUS AND METHODS FOR PREDICTING A STATE OF VISIBILITY FOR A ROAD OBJECT BASED ON A LIGHT SOURCE ASSOCIATED WITH THE ROAD OBJECT

(71) Applicant: HERE GLOBAL B.V., Eindhoven (NL)

(72) Inventors: Jeremy Michael Young, Chicago, IL (US); Jerome Beaurepaire, Berlin (DE); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 387 days.

(21) Appl. No.: 17/362,122

(22) Filed: Jun. 29, 2021

(65) Prior Publication Data

US 2022/0410881 A1 Dec. 29, 2022

(51) Int. Cl.
*B60W 30/095* (2012.01)
*G06T 7/70* (2017.01)
*G06V 10/25* (2022.01)
*G06V 20/58* (2022.01)

(52) U.S. Cl.
CPC ............ *B60W 30/095* (2013.01); *G06T 7/70* (2017.01); *G06V 10/25* (2022.01); *G06V 20/584* (2022.01); *B60W 2554/404* (2020.02); *G06T 2207/30261* (2013.01)

(58) Field of Classification Search
CPC . B60W 30/095; B60W 2554/404; G06T 7/70; G06T 2207/30261; G06V 10/25; G06V 20/584
See application file for complete search history.

(56) References Cited

U.S. PATENT DOCUMENTS

| 8,618,922 | B2 | 12/2013 | Debouk et al. |
| 10,296,795 | B2 | 5/2019 | Kwant et al. |
| 10,551,849 | B2 | 2/2020 | Agarwal et al. |
| 10,921,810 | B2 | 2/2021 | Kutila et al. |
| 2006/0241865 | A1* | 10/2006 | Smith ................. G08B 27/006 702/3 |

(Continued)

FOREIGN PATENT DOCUMENTS

WO 2014168851 A1 10/2014

OTHER PUBLICATIONS

Gern, A. & Moebus, R. & Franke, Uwe., Vision-based lane recognition under adverse weather conditions using optical flow, IEEE Intelligent Vehicle Symposium, 200, 652-657, vol. 2.

*Primary Examiner* — Andrew J Cromer
(74) *Attorney, Agent, or Firm* — Peter H. Yu; HERE GLOBAL B.V.

(57) ABSTRACT

An apparatus, method and computer program product are provided for determining a state of visibility for a road object. In one example, the apparatus receives temporal data, calculates an orientation of a light source with respect to a road object using the temporal data, and predicts a state of visibility for the road object based on the orientation of the light source. In another example, the apparatus determines an artificial light source associated with a road object, receives attribute data associated with the artificial light source, determines a state of the artificial light source using the attribute data, and predicts a state of visibility for the road object based on the state of the artificial light source.

15 Claims, 14 Drawing Sheets

(56) References Cited

U.S. PATENT DOCUMENTS

| | | |
|---|---|---|
| 2016/0357187 A1 | 12/2016 | Ansari |
| 2019/0179025 A1* | 6/2019 | Englard ................ G01S 13/865 |
| 2020/0064855 A1 | 2/2020 | Ji et al. |
| 2020/0090322 A1* | 3/2020 | Seo ........................ G06N 3/084 |
| 2021/0190511 A1* | 6/2021 | Sergeev .................. G06F 16/29 |

* cited by examiner

APPARATUS AND METHODS FOR PREDICTING A STATE OF VISIBILITY FOR A ROAD OBJECT BASED ON A LIGHT SOURCE ASSOCIATED WITH THE ROAD OBJECT

TECHNICAL FIELD

The present disclosure generally relates to the field of navigation, associated methods and apparatus, and in particular concerns, for example, an apparatus configured to determine a state of visibility for a road object, such as a road marking, based on one or more light sources associated with the road object.

BACKGROUND

Modern vehicles are equipped with sensors that are capable of detecting road objects, such as road markings. Data acquired by detecting road objects can be used for updating a map database, providing contextual information for navigation-related applications, enhancing localization performed by autonomous vehicles, etc. In certain circumstances, the sensors may fail to detect the road objects, thereby hindering vehicle functions such as autonomous vehicle maneuvers. Further, once the sensors fail to detect the road objects, the vehicles generally do not provide a reason as to why the sensors failed to observe the road objects. As such, map developers cannot confidently update map data associated with the road objects.

The listing or discussion of a prior-published document or any background in this specification should not necessarily be taken as an acknowledgement that the document or background is part of the state of the art or is common general knowledge.

BRIEF SUMMARY

According to a first aspect, a non-transitory computer-readable storage medium having computer program code instructions stored therein is described. The computer program code instructions, when executed by at least one processor, cause the at least one processor to receive temporal data, calculate an orientation of a light source with respect to a road object using the temporal data, and predict a state of visibility for the road object based on the orientation of the light source.

According to a second aspect, an apparatus comprising at least one processor and at least one non-transitory memory including computer program code instructions is described. The computer program code instructions, when executed, cause the apparatus to determine an artificial light source associated with a road object, receive attribute data associated with the artificial light source, determine a state of the artificial light source using the attribute data, and predict a state of visibility for the road object based on the state of the artificial light source.

According to a third aspect, a method of updating a map layer based on a state of visibility for a road object is described. The method includes receiving sensor observation data. The method further includes determining attribute data associated with a light source affecting visibility of the road object in response to the sensor observation data indicating that the road object of a road segment was not observed by a sensor. The method further includes determining the state of visibility for the road object based on the attribute data, generating a data point for the map layer associated with the road segment based on the state of visibility, and storing the data point in a database associated with the map layer. The map layer includes the data point and one or more other data points that indicate one or more other states of visibility for one or more other road objects associated with the road segment.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

BRIEF DESCRIPTION OF THE DRAWINGS

The embodiments of the invention are illustrated by way of example, and not by way of limitation, in the figures of the accompanying drawings.

DETAILED DESCRIPTION

Figure 1A:
FIG. 1A illustrates a first example image of a road environment captured by a vehicle camera during daytime.
Figure 1B:
FIG. 1B illustrates a second example image of another road environment captured by a vehicle camera during night-time.

Modern vehicles may be equipped with cameras, and the cameras may be used to identify road objects, such as road markings, thereby providing contextual information for enhancing a map database, navigation-related applications, etc. The road markings may be, for example, road boundary markings, center lane markings of various colors and types, solid lines and/or dashed lines, pictorial markings on the street, turn arrows, crosswalk markings, a combination alphanumeric symbols, etc. However, the cameras may fail to detect the road objects in locations that are anticipated to include such road objects due to unexpected circumstances that hinder the visibility of the road objects. By way of example, FIG. 1A is a first example image 100A of a road environment captured by a vehicle camera during daytime. In the illustrated example, broken white line markings are positioned on the center of a road segment; however, in the image, a combination of the angle of the sun and the intensity thereof renders the crosswalk obscured due to a glare generated by the sun. Using map data associated with the road segment, a vehicle may be aware that the broken white line markings should exist in front of the vehicle; however, due to the glare, the vehicle fails to identify the broken white line markings within the first image. FIG. 1B is a second example image 100B of another road environment captured by a vehicle camera during night-time. In the illustrated example, a rainstorm has recently affected the road environment, and building lights and billboard background lights are activated. Light rays propagating from the building lights and the billboard background lights are reflected off precipitation formed on top of a crosswalk, thereby obscuring the crosswalk. Accordingly, a vehicle may fail to identify the crosswalk within the second image 100B. While the road objects shown in the aforementioned example images are road markings, it should be appreciated that other road objects, such as traffic signs, posts, traffic lights, manholes, rail roads, median strips, road boundaries, etc., may become obscured due to a way of which a light source (such as the sun) affects the visibility thereof. For example, road objects such as traffic lights and traffic signs may be rendered obscured due to a glare generated by the sun during a golden hour. In many cases, vehicles traverse locations anticipated to include road objects and fail to identify the road objects within those locations due to such circumstances, and the computing systems associated therewith merely generate a flag indicating that the road objects were not observed. Since the vehicles fail to identify a reason as to why the road object was observed by cameras, map content providers cannot update the map database or data associated with the road objects with confidence. Further, since visibility of many road objects within a road environment is critical for ensuring safety for drivers and pedestrians, the aforementioned circumstances may render hazard for those within the road environment.

There will now be described an apparatus and associated methods that may address these issues.

Figure 2A:
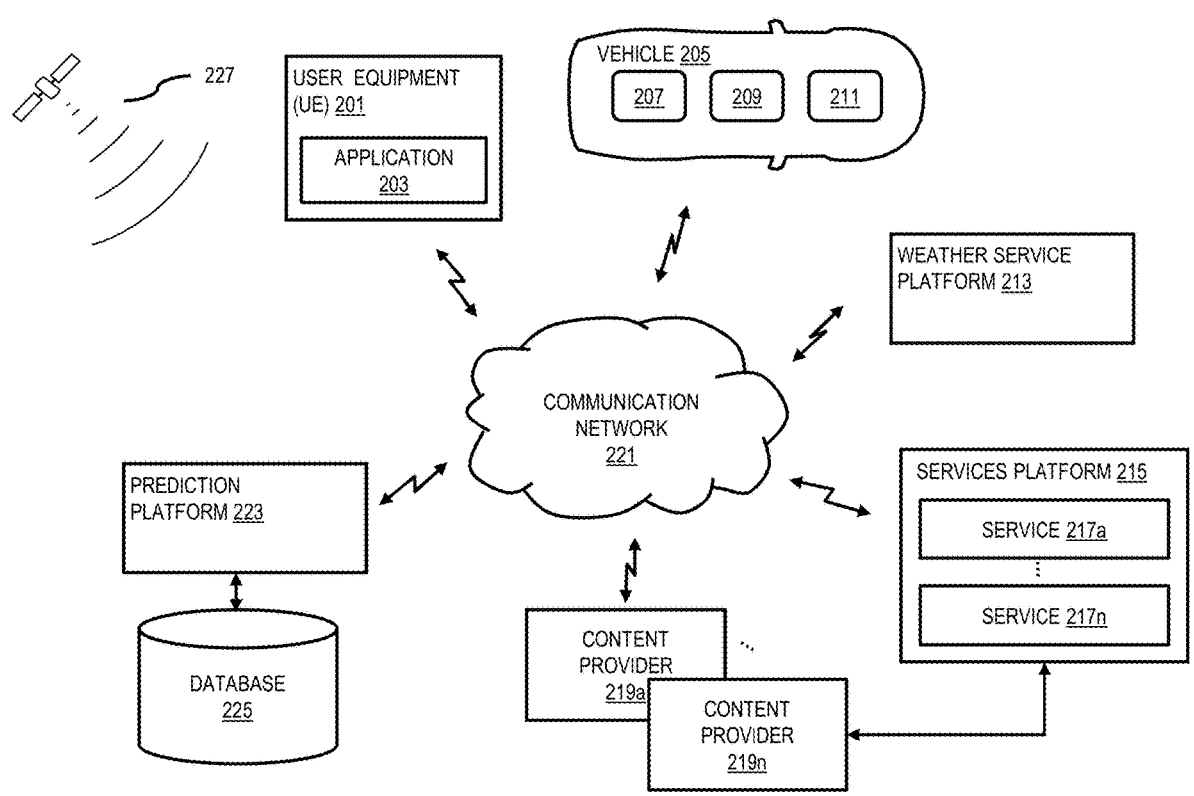
FIG. 2A illustrates a diagram of a system capable of determining a state of visibility of a road object.

FIG. 2A is a diagram of a system 200 capable of determining a state of visibility for a road object, such as at least one road marking, according to one embodiment. The system includes a user equipment (UE) 201, a vehicle 205, a weather service platform 213, a services platform 215, content providers 219a-219n, a communication network 221, a prediction platform 223, a database 225, and a satellite 227. Additional or a plurality of mentioned components may be provided.

In the illustrated embodiment, the system 200 comprises a user equipment (UE) 201 that may include or be associated with an application 203. In one embodiment, the UE 201 has connectivity to the prediction platform 223 via the communication network 221. The prediction platform 223 performs one or more functions associated with predicting a state of visibility for a road object. In the illustrated embodiment, the UE 201 may be any type of mobile terminal or fixed terminal such as a mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, devices associated with or integrated with one or more vehicles (including the vehicle 205), or any combination thereof, including the accessories and peripherals of these devices. In one embodiment, the UE 201 can be an in-vehicle navigation system, a personal navigation device (PND), a portable navigation device, a cellular telephone, a mobile phone, a personal digital assistant (PDA), a watch, a camera, a computer, and/or other device that can perform navigation-related functions, such as digital routing and map display. In one embodiment, the UE 201 can be a cellular telephone. A user may use the UE 201 for navigation functions, for example, road link map updates. It should be appreciated that the UE 201 can support any type of interface to the user (such as "wearable" devices, etc.). In one embodiment, the one or more vehicles may have cellular or Wi-Fi connection either through the inbuilt communication equipment or from the UE 201 associated with the vehicles. The application 203 may assist in conveying information regarding at least one attribute associated a travel link via the communication network 221. In one embodiment, the travel link includes road links (e.g., a stretch of road), nodes (e.g., points where two or more road links connect). The travel link may indicate a navigational route to a destination requested by a user.

In the illustrated embodiment, the application 203 may be any type of application that is executable by the UE 201, such as a mapping application, a location-based service application, a navigation application, a content provisioning service, a camera/imaging application, a media player application, a social networking application, a calendar application, or any combination thereof. In one embodiment, one of the applications 203 at the UE 201 may act as a client for the prediction platform 223 and perform one or more functions associated with the functions of the prediction platform 223 by interacting with the prediction platform 223 over the communication network 221.

The vehicle 205 may be a standard gasoline powered vehicle, a hybrid vehicle, an electric vehicle, a fuel cell vehicle, and/or any other mobility implement type of vehicle. The vehicle 205 includes parts related to mobility, such as a powertrain with an engine, a transmission, a suspension, a driveshaft, and/or wheels, etc. The vehicle 205 may be a manually controlled vehicle, semi-autonomous vehicle (e.g., some routine motive functions, such as parking, are controlled by the vehicle 205), or an autonomous vehicle (e.g., motive functions are controlled by the vehicle 205 without direct driver input). In this illustrated example, the vehicle 205 includes a plurality of sensors 207, an on-board computing platform 209, and an on-board communication platform 211.

The autonomous level of a vehicle can be a Level 0 autonomous level that corresponds to no automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle. In one embodiment, the UE 201 may be integrated in the vehicle 205, which may include assisted driving vehicles such as autonomous vehicles, highly assisted driving (HAD), and advanced driving assistance systems (ADAS). Any of these assisted driving systems may be incorporated into the UE 201. Alternatively, an assisted driving device may be included in the vehicle 205. The assisted driving device may include memory, a processor, and systems to communicate with the UE 201.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands.

In one embodiment, the vehicle 205 may be an HAD vehicle or an ADAS vehicle. An HAD vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the on the position of the vehicle and may respond to lane marking indicators (lane marking type, lane marking intensity, lane marking color, lane marking offset, lane marking width, or other characteristics) and driving commands or navigation commands. Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the lane marking indicators (lane marking type, lane marking intensity, lane marking color, lane marking offset, lane marking width, or other characteristics) and driving commands or navigation commands.

In the illustrated embodiment, the sensors 207 may include image sensors (e.g., electronic imaging devices of both analog and digital types, which include digital cameras, camera modules, camera phones, thermal imaging devices, radar, sonar, lidar, etc.), a global positioning sensor for gathering location data, a network detection sensor for detecting wireless signals or receivers for different short-range communications (e.g., Bluetooth, Wi-Fi, Li-Fi, near field communication (NFC) etc.), temporal information sensors, an audio recorder for gathering audio data, velocity sensors, light sensors, oriental sensors augmented with height sensor and acceleration sensor, tilt sensors to detect the degree of incline or decline of the vehicle 205 along a path of travel, etc. In a further embodiment, sensors about the perimeter of the vehicle 205 may detect the relative distance of the vehicle 205 from road objects (e.g., road markings), lanes, or roadways, the presence of other vehicles, pedestrians, traffic lights, road objects, road features (e.g., curves) and any other objects, or a combination thereof. In one embodiment, the vehicle 205 may include GPS receivers to obtain geographic coordinates from satellites 227 for determining current location and time associated with the vehicle 205. Further, the location can be determined by a triangulation system such as A-GPS, Cell of Origin, or other location extrapolation technologies. One or more of the sensors 207 may be installed on the exterior surface or external components of the vehicle 205, within the interior cabin of the vehicle 205, between the interior cabin and the exterior surface of the vehicle 205, or a combination thereof.

The on-board computing platform 209 performs one or more functions associated with the vehicle 205. In one embodiment, the on-board computing platform 209 may aggregate sensor data generated by at least one of the sensors 207 and transmit the sensor data via the on-board communications platform 211. The on-board computing platform 209 may receive control signals for performing one or more of the functions from the prediction platform 223, the UE 201, the services platform 215, one or more of the content providers 219a-219n, or a combination thereof via the on-board communication platform 211. The on-board computing platform 209 includes at least one processor or controller and memory (not illustrated). The processor or controller may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory includes multiple kinds of memory, particularly volatile memory and non-volatile memory.

The on-board communications platform 209 includes wired or wireless network interfaces to enable communication with external networks. The on-board communications platform 209 also includes hardware (e.g., processors, memory, storage, antenna, etc.) and software to control the wired or wireless network interfaces. In the illustrated example, the on-board communications platform 209 includes one or more communication controllers (not illustrated) for standards-based networks (e.g., Global System for Mobile Communications (GSM), Universal Mobile Telecommunications System (UMTS), Long Term Evolution (LTE) networks, 5G networks, Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the on-board communications platform 209 includes a wired or wireless interface (e.g., an auxiliary port, a Universal Serial Bus (USB) port, a Bluetooth® wireless node, etc.) to communicatively couple with the UE 201.

The communication network 221 of system 200 includes one or more networks such as a data network, a wireless network, a telephony network, or any combination thereof. The data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the weather service platform 213 provides any type of weather data. In one embodiment, the weather service platform 213 provides weather forecast data such as precipitation type, precipitation intensity, air temperature, precipitation rate, atmospheric pressure, wind direction, etc. The weather service platform 213 may be a US National Weather Service (NWS) platform, a Weather Channel platform, or any other local or national weather platforms. The weather forecast data may be generated in a number of ways, such as through the use of various sensors, such as anemometers, wind vanes, pressure sensors, thermometers, hygrometers, rain gauges, doppler radars, or any combination thereof to live-track the current weather readings and build a weather forecast based on the readings. The data may also be updated, such as through on-the-ground crews used by the weather service platform 213 to confirm the weather forecast. Thus, while a weather forecast may be mapped to an area in real-time or near-real time (i.e., within seconds or minutes), the mapped region associated with the weather forecast may change as more data is gathered. In one embodiment, the weather forecast data may also be gathered based on crowd-sourcing, such as weather events identified through individual weather stations from which users share data. These weather stations may be small devices mounted at a property by an owner to contribute to the gathering of weather information which enhances weather forecasting. These weather stations may also be used to form a better understanding of where a weather event has taken place.

The service platform 215 may be an original equipment manufacturer (OEM) platform that provides one or more services 217a-217n (collectively referred to as services 217). In one embodiment the one or more service 217 may be sensor data collection services. By way of example, vehicle sensor data provided by the sensors 207 may be transferred to the UE 201, the prediction platform 223, the database 225, or other entities communicatively coupled to the communication network 221 through the service platform 215. By way of example, the services 217 may also be other third-party services and include mapping services, navigation services, travel planning services, notification services, social networking services, content (e.g., audio, video, images, etc.) provisioning services, application services, storage services, contextual information determination services, location based services, information based services, etc. In one embodiment, the services platform 215 uses the output data generated by of the prediction platform 223 to provide services such as navigation, mapping, other location-based services, etc.

In one embodiment, the content providers 219a-219n (collectively referred to as content providers 219) may provide content or data (e.g., including geographic data, parametric representations of mapped features, etc.) to the UE 201, the vehicle 205, services platform 215, the vehicle 205, the database 225, the prediction platform 223, or the combination thereof. The content provided may be any type of content, such as map content, textual content, audio content, video content, image content, etc. In one embodiment, the content providers 219 may provide content that may aid in detecting road objects, predicting visibility of road objects, or other related characteristics. In one embodiment, the content providers 219 may also store content associated with the UE 201, the vehicle 205, services platform 215, the vehicle 205, the database 225, the prediction platform 223, or the combination thereof. In another embodiment, the content providers 219 may manage access to a central repository of data, and offer a consistent, standard interface to data, such as a repository of the database 225.

In the illustrated embodiment, the prediction platform 223 may be a platform with multiple interconnected components. The prediction platform 223 may include multiple servers, intelligent networking devices, computing devices, components and corresponding software for predicting a state of visibility for a road object. It should be appreciated that that the prediction platform 223 may be a separate entity of the system 200, included within the UE 201 (e.g., as part of the applications 103), included within the vehicle 205 (e.g., as part of an application stored in memory of the on-board computing platform 209), included within the services platform 215 (e.g., as part of an application stored in server memory for the services platform 215), or a combination thereof.

The prediction platform 223 may predict a state of visibility for a road object, such as a road marking. The prediction platform 223 may receive temporal data, where the temporal data may indicate a time at which the road object is estimated to be: (1) encountered by the vehicle 205; (2) within a detection range of the sensors 209; (3) within a field-of-view for a human driver of the vehicle 205; or (4) a combination thereof. By way of example, the detection range may be a fixed range that is determined based on a maximum range at which the sensors 209 can detect the road object. By way of another example, the field-of-view for a human driver may be defined by a fixed range that is determined based on an average eye sight range for a human. In one embodiment, the temporal data may be an arbitrary time provided by a source (e.g., the UE 201, the vehicle 205, or other entity) that requests a prediction from the prediction platform 223. In one embodiment, the temporal data may further indicate a date corresponding to the time. When the temporal data are received, the prediction platform 223 may interpret the receipt of the temporal data as a request for rendering the prediction of the state of visibility for the road object at the time, as indicated by the temporal data.

Using the temporal data, the prediction platform 223 may identify a type of light source that may affect the visibility of the road object. The type of light source may be one of two types: artificial light source (e.g., street lights, building lights, traffic lights, vehicle lights, etc.) and natural light source (i.e., the sun). The prediction platform 223 may determine the type of light source based on the time indicated in the temporal data. By way of example, if the time indicated by the temporal data is any time within a daytime period, the prediction platform 223 may determine that the light source affecting the road object is natural. If the time indicated by the temporal data is any time outside the daytime period, the prediction platform 223 may determine whether there is at least one artificial light source that affects the visibility of the road object.

If the prediction platform 223 determines that the light source is a natural light source, the prediction platform 223 calculates a sun angle with respect to the location at which the road object is disposed using the time and date indicated by the temporal data. In one embodiment, the prediction platform 223 may further determine an intensity of the sunlight as a function of the sun angle and a weather condition associated with the location of the road object. In such embodiment, the weather condition may indicate whether the atmosphere of the location of the road object affects light propagating from the natural light source (e.g., cloudiness). If a sun angle is within a threshold range and/or the light intensity of the sunlight reaches or exceeds a threshold value, the prediction platform 223 may predict that the road object will be obscured at the time and date, as indicated in the temporal data. The parameter for predicting obscurity (e.g., setting the threshold range and value) may be determined based on historical data. By way of example, the historical data may include, for a past time or duration, an image captured by an image sensor at an observation location and an indication that the image sensor has failed to identify the road object within the image due to a glare condition rendered by the sun angle or intensity corresponding to the past time or duration. Herein, the observation location may refer to a location at which: (1) a vehicle is estimated to encounter the road object; (2) the road object is estimated to be within a detection range of a sensor; (3) the road object is estimated to be within a field-of-view for a human driver; or (4) a combination thereof. The observation location may be defined within a road segment, link, or node that includes the road object. In one embodiment, the prediction platform 223 may include a machine learning model that is trained to establish the parameter using the historical data. In practice, the machine learning model may be continuously trained to modify the parameter by receiving ground truth data at real time.

If the prediction platform 223 the time indicated by the temporal data is outside the daytime period, the prediction platform 223 determines whether one or more artificial light sources affecting the visibility of the road object exists. The prediction platform 223 determines the one or more artificial light source affecting the visibility of the road object based on proximity of one or more artificial light source with respect to the location of the road object. In one embodiment, in addition to determining the proximity of the one or more artificial light source, the prediction platform 223 may further determine a presence of an obstacle obstructing light propagating from the one or more artificial light source to the road object. The prediction platform 223 may only select artificial light sources whose light propagations are unobstructed or slightly obstructed by the obstacle as the one or more artificial light source affecting the visibility of the road object. Such selection may be rendered based on: (1) the position/orientation of the road object; (2) the position/orientation of the artificial light source; and (3) the position/orientation of the obstacle. Additionally or alternatively, to determine the one or more artificial light source that affects the visibility of the road object, the prediction platform 223 may rely on historical data including one or more images including the road object and one or more artificial light sources. If at least one artificial light source affecting the visibility of the road object exists, the prediction platform 223 may acquire attribute data from the database 225, an establishment that controls the artificial light source, or a combination thereof. The attribute data may at least indicate a timing at which the artificial light generates light. In one embodiment, the attribute data may additionally indicate (1) one or more durations at which at which the artificial light source generates light at one or more levels of intensity; (2) one or more durations at which the artificial light source generates light as one or more colors; (3) an intensity at which the artificial light source generates light; or (4) a combination thereof. In one embodiment, the prediction platform 223 may acquire a plurality of images of the artificial light source over time to determine the attribute data associated with the road object (e.g., the timing at which the artificial light generates light). Using the attribute data, the prediction platform 223 may identify a state of the artificial light source at the timing indicated by the temporal data. Using the state of the artificial light source, the prediction platform 223 may predict the visibility of the road object.

In one embodiment, the prediction platform 223 may predict the visibility of the road object based further on a weather condition that is affecting or has affected the location of the road object. Since the weather condition may affect the way of which the light propagates from the light source to the road object (e.g., precipitation reflecting/refracting light), the visibility of the road object is rendered as a function of the type of weather condition, timing/duration of the weather condition, intensity of the weather condition, etc.

In one embodiment, the prediction platform 223 may predict the visibility of the road object based further on a road object attribute data. Since the road object attribute data may indicate how the road object interacts with light propagated from a light source (e.g., light reflectivity of the road object), the visibility of the road object may be rendered as a function of the road object attribute data.

In one embodiment, the prediction platform 223 may predict the visibility of the road object based further on one or more obstructing objects that are predicted to affect light propagation from the light source at the time indicated by the temporal data. Since static objects (e.g., buildings) and/or dynamic objects (e.g., other vehicles) can obstruct light propagating from a light source, the visibility of the road object may be rendered as a function of the obstructing object. In such embodiment, the prediction of whether a dynamic object will affect light propagating from the light source at the time indicated by the temporal data may be rendered based on: (1) current and/or past measurements of the dynamic object (e.g., the speed, the heading, the travel link, acceleration, deceleration of the dynamic object); (2)

traffic density information regarding a portion of the travel link or a road segment associated with the road object at the time indicated by the temporal data; or (3) a combination thereof.

In one embodiment, the prediction platform 223 may predict the visibility of the road object using a brightness image histogram associated with an image including the road object and captured at the observation location. Since one or more pixel locations within the brightness image resembles the location of the road object within the image, the brightness level(s) corresponding to the one or more pixel locations may indicate that the road object is obscured due to a glare.

In one embodiment, the prediction platform 223 may use the predicted state of visibility for the road object to perform one or more applications such as: (1) updating a map to include information associated with the state of visibility; (2) causing a transmission of a notification indicating the state of visibility to the UE 201, the vehicle 205, the services platform 215, the content providers 219, or a combination thereof; (3) generating a visual indicator informing the state of visibility; (4) generating a travel link that avoids the road object; (5) causing the vehicle 205 that is estimated to encounter the road object at a time and date associated with temporal data to change usage of a first set of vehicle sensors to a second set of vehicle sensors; (6) causing an autonomous or semi-autonomous vehicle (e.g., vehicle 205) to change from an autonomous mode to a manual mode; or (7) a combination thereof.

In one embodiment, the prediction platform 223 may predict the state of visibility for the road object and use the predicted state of visibility to generate a data point for updating a map layer. In such embodiment, the map layer may include one or more data points, where each of the one or more data points indicate a state of visibility for said road object for a given time and date.

In one embodiment, the prediction platform 223 may determine the state of visibility for the road object when sensor observation data received from a sensor (e.g., the sensors 207) indicate that the road object was not observed by the sensor. The determined state of visibility for the road object may be used as a reason as to why the road object was not observed by the sensor. Such reason may be stored as a data point for updating the map layer.

In the illustrated embodiment, the database 225 stores information on road links (e.g., road signs associated with road links, road length, road breadth, slope information, curvature information, etc.) and probe data for one or more road links (e.g., traffic density information). In one embodiment, the database 225 may include any multiple types of information that can provide means for aiding in a prediction of a state of visibility for any road object. It should be appreciated that the information stored in the database 225 may be acquired from any of the elements within the system 100, other vehicles, sensors, database, or a combination thereof.

In one embodiment, the UE 201, the vehicle 205, the weather service platform 213, the service platform 215, the content providers 219, the prediction platform 223 communicate with each other and other components of the communication network 221 using well known, new or still developing protocols. In this context, a protocol includes a set of rules defining how the network nodes within the communication network 221 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2B:
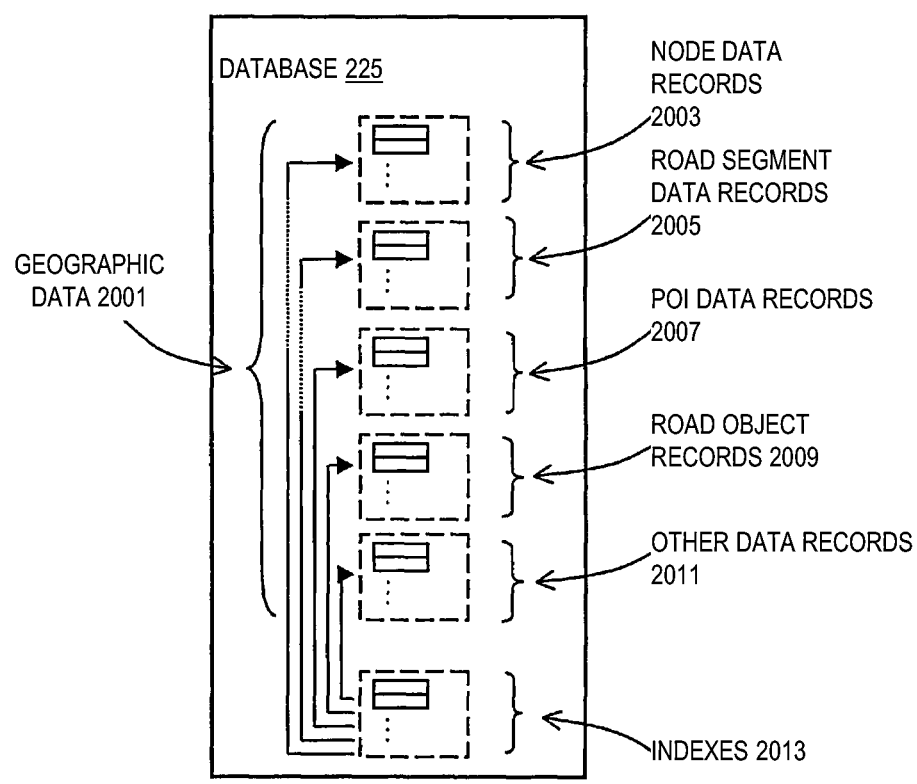
FIG. 2B illustrates a diagram of the database within the system of FIG. 2A.

FIG. 2B is a diagram of a database 225 (e.g., a map database), according to one embodiment. In one embodiment, the database 225 includes geographic data 2001 used for (or configured to be compiled to be used for) mapping and/or navigation-related services. In one embodiment, the following terminology applies to the representation of geographic features in the database 225.
  a. "Node"—A point that terminates a link.
  b. "Line segment"—A straight line connecting two points.
  c. "Link" (or "edge")—A contiguous, non-branching string of one or more line segments terminating in a node at each end.

In one embodiment, the database 225 follows certain conventions. For example, links do not cross themselves and do not cross each other except at a node. Also, there are no duplicated shape points, nodes, or links. Two links that connect each other have a common node.

As shown, the database 225 includes node data records 2003, road segment or link data records 2005, point of interest (POI) data records 2007, road object records 2009, other records 2011, and indexes 2013, for example. More, fewer or different data records can be provided. In one embodiment, additional data records (not shown) can include cartographic ("carto") data records, routing data, and maneuver data. In one embodiment, the indexes 2013 may improve the speed of data retrieval operations in the database 225. In one embodiment, the indexes 2013 may be used to quickly locate data without having to search every row in the database 225 every time it is accessed.

In exemplary embodiments, the road segment data records 2005 are links or segments representing roads, streets, or paths, as can be used in the calculated route or recorded route information for determination of one or more personalized routes. The node data records 2003 are end points (such as intersections) corresponding to the respective links or segments of the road segment data records 2005. The road link data records 2005 and the node data records

2003 represent a road network, such as used by vehicles, cars, and/or other entities. Alternatively, the database 225 can contain path segment and node data records or other data that represent pedestrian paths or areas in addition to or instead of the vehicle road record data, for example.

Links, segments, and nodes can be associated with attributes, such as geographic coordinates, street names, address ranges, speed limits, turn restrictions at intersections, presence of a construction work site, and other navigation related attributes, as well as POIs, such as gasoline stations, hotels, restaurants, museums, stadiums, offices, automobile dealerships, auto repair shops, buildings, stores, parks, etc. The database 225 can include data about the POIs and their respective locations in the POI data records 2007. The data about the POIs may include attribute data associated with the POIs such as a type of POI, a shape of POI, a dimension(s) of POI, a number of stories included in each of the POIs, one or more artificial light sources associated with the POIs (e.g., building lights), a position/orientation of the one or more artificial light sources, timing at which the one or more artificial light sources are activated, attribute associated with the one or more artificial light sources (e.g., color, intensity, etc.), etc. The database 225 can also include data about places, such as cities, towns, or other communities, and other geographic features, such as bodies of water, mountain ranges, etc. Such place or feature data can be part of the POI data records 2007 or can be associated with POIs or POI data records 2007 (such as a data point used for displaying or representing a position of a city).

In one embodiment, the database 225 can also include road object records 2009 for storing road object attribute data. The road object attribute data can indicate a road object position/orientation, sign information displayed by the road object, road object dimensions, type, classification, color, composition, a degree at which the road object reflects/refracts light, whether the road object is translucent or opaque, etc. The road object records 2009 may include information indicating whether a road object is associated with a specific segment of a road link (as opposed to an entire link) and information indicating a flow of traffic that the road object is designed to be associated with within a given node. In one embodiment, the road object records 2009 may be associated with or integrated partially or wholly with one or more of the node records 2003, road segment records 2005, POI data records 2007, and/or other data record 2013.

Other records 2013 may include can include data associated one or more artificial light sources that are not associated with POIs (e.g, streetlights). Such data may include attribute data indicating a position/orientation of the one or more artificial light sources, timing at which the one or more artificial light sources are activated, attribute associated with the one or more artificial light sources (e.g., color, intensity, etc.), dimensions, orientation, type, classification, etc. Other records 2013 may further include historical data indicating past states of one or more attributes of links, segments, nodes, road objects, POIs, etc. The past states may include past states of visibility for a road object as a function of past weather condition, past states of light sources (e.g., artificial and natural light sources), past sun angles, past ways of which an obstructing object affects light propagating from the light source (e.g., a way of which a shadow casted by the obstructing object affects the visibility of a road object), etc. The historical data may be used as ground truth data, and The ground truth data can be used for training a machine learning model for predicting a state of visibility for the road object.

In one embodiment, the database 225 can be maintained by one or more of the content providers 219 in association with a map developer. The map developer can collect geographic data to generate and enhance the database 225. There can be different ways used by the map developer to collect data. These ways can include obtaining data from other sources, such as municipalities or respective geographic authorities. In addition, the map developer can employ field personnel to travel by vehicle along roads throughout the geographic region to observe road signs and/or record information about them, for example. Also, remote sensing, such as aerial or satellite photography, can be used.

The database 225 can be a master database stored in a format that facilitates updating, maintenance, and development. For example, the master database or data in the master database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the vehicle 205, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received database in a delivery format to produce one or more compiled navigation databases.

The processes described herein for determining a state of visibility for a road object may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 3:
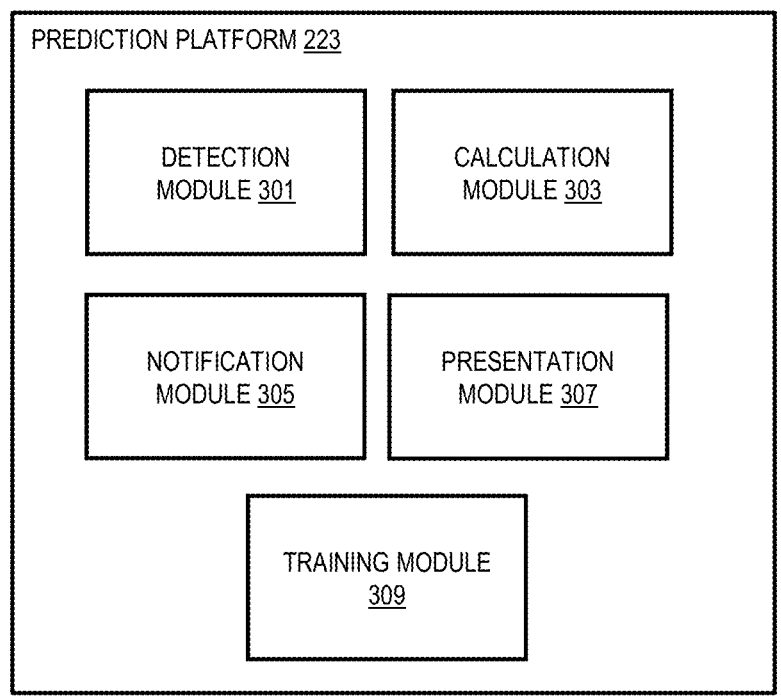
FIG. 3 illustrates a diagram of the components of the prediction platform within the system of FIG. 2A.

FIG. 3 is a diagram of the components of the prediction platform 223, according to one embodiment. By way of example, the prediction platform 223 includes one or more components for determining a state of visibility for a road object. It is contemplated that the functions of these components may be combined in one or more components or performed by other components of equivalent functionality. In this embodiment, the prediction platform 223 includes a detection module 301, a calculation module 303, a notification module 305, a presentation module 307, and a training module 309.

The detection module 301 may acquire information necessary for rendering the prediction of the state of visibility for the road object. The detection module 301 may acquire the temporal data from one or more requesting source within the system 100. For example, a user may request a navigational route to a destination via the UE 201 or a user interface provided within the vehicle 207. The detection module 301 may detect one or more road objects associated with a travel link and generate the temporal data by estimating a time (and date) of which the vehicle 207 is estimated to encounter each of the one or more road objects. In one embodiment, the detection module 301 may: (1) automatically detect a current road segment/link of which the vehicle 207 is traversing; (2) detect one or more road objects within a portion of the road segment/link that the vehicle 207 has yet to traverse; and (3) determine the temporal data associated with each of the one or more road objects. In one embodiment, the detection module 301 may acquire road object attribute data associated with each of the one or more road objects from the road object records 2009. In one embodiment, the detection module 301 may identify a weather condition that is affecting or has affected the location associated with each of the one or more road objects using weather forecast data associated with the location. In such embodiment, the detection module 301 receives the weather forecast data from the weather service platform 213. In one embodiment, the detection module 301 may detect one or more artificial light source that affects the visibility of the road object. In such embodiment, the detection module 301 acquires data from the POI data records 2007 and/or other data records 2011 to determine whether an artificial light source, such as a building light or a street light, is proximate to the road object. In one embodiment, the detection module 301 acquires data from the road object records 2009, the POI data records 2007, other data records 2011, or a combination thereof to determine whether an obstructing object is proximate to the road object. In one embodiment, the detection module 301 may identify one or more other vehicles communicatively coupled to the communication network 221 and determine whether the one or more other vehicles is proximate to the vehicle 205 and is sharing the travel link or the road segment/link of which the vehicle 205 is traversing. In one embodiment, the detection module 301 may acquire traffic density information regarding any road segment/link/node at one or more past times, real-time, one or more future times, or a combination thereof. The traffic density information related to the one or more future times may be derived as a function of the traffic density information related to the one or more past times, real-time, or a combination thereof. It should be appreciated that the detection module 301 may receive any data from any of the components within the system 100 or any system or device communicatively coupled to the communication network 221.

The calculation module 303 renders the prediction of the state of visibility for the road object using the information acquired by the detection module 301. In one embodiment, the calculation module 303 determines a type of light source that is affecting the road object using the temporal data. If the time indicated by the temporal data is any time within a daytime period, the calculation module 303 may determine that the light source affecting the road object is natural. If the time indicated by the temporal data is any time outside the daytime period, the calculation module 303 may determine whether at least one artificial light source affects the visibility of the road object. The calculation module 303 may determine the daytime period as a function of both the time and date indicated by the temporal data. By way of example, dates corresponding to a colder seasonal period generally have a shorter daytime period, whereas dates corresponding to a warmer seasonal period generally have a longer daytime period. As such, the calculation module 303 may determine the daytime period by considering the seasonal changes.

If the calculation module 303 determines that the time indicated by the temporal data is within the daytime period, the calculation module 303 calculates a sun angle with respect to the location at which the road object is disposed using the time and date indicated by the temporal data. The date may be used to calculate a distance between the earth and the sun. The time may be used to calculate an orientation at which the earth faces the sun. Accordingly, using known equations, the calculation module 303 may calculate the sun angle with respect to the location at which the road object is disposed as a function of the time and date indicated by the temporal data. In one embodiment, the calculation module 303 may further determine an intensity of the sunlight as a function of the sun angle and a weather condition associated with the location of the road object. In such embodiment, the weather condition may indicate whether the atmosphere of the location of the road object affects light propagating from the natural light source (e.g., cloudiness). If a sun angle is within a threshold range and/or the light intensity of the sunlight reaches or exceeds a threshold value, the calculation module 303 may predict that the road object will be obscured at the time and date, as indicated in the temporal data.

If the calculation module 303 determines that the time indicated by the temporal data is outside the daytime period, the calculation module 303 determines whether one or more artificial light source affecting the visibility of the road object exists. The calculation module 303 communicates with the detection module 301 to determine the one or more artificial light source affecting the visibility of the road object by determining the proximity of one or more artificial light source with respect to the location of the road object. In one embodiment, the calculation module 303 further determines one or more obstacles obstructing light propagating from the one or more artificial light source to the road object and selects artificial light sources whose light propagations are unobstructed or slightly obstructed by the obstacle as the one or more artificial light source affecting the visibility of the road object. The calculation module 303 selects the artificial light source based on: (1) the position of the road object; (2) the position of the artificial light source; and (3) the position of the obstacle. Additionally or alternatively, to determine the one or more artificial light source that affects the visibility of the road object, the calculation module 303 may receive and process historical data including one or more images of the road object and one or more artificial light sources. If at least one light source affecting the visibility of the road object exists, the calculation module 303 may acquire attribute data associated with the artificial light source from the database 225 (e.g., from the POI data records 2009 and other data records 2011). The attribute data may at least indicate a timing at which the artificial light generates light. In one embodiment, the attribute data may additionally indicate (1) one or more durations at which at which the artificial light source generates light at one or more levels of intensity; (2) one or more durations at which the artificial light source generates light as one or more colors; (3) an intensity at which the artificial light source generates light; or (4) a combination thereof. In one embodiment, the calculation module 303 may acquire a plurality of images of the artificial light source over time to determine the attribute data associated with the road object (e.g., the timing at which the artificial light generates light). Using the attribute data, the calculation module 303 may identify a state of the artificial light source at the time indicated by the temporal data. Using the state of the artificial light source, the calculation module 303 may predict the visibility of the road object. By way of example, the state of the of the artificial light source may be that the artificial light source is activated and generating light at a high level of intensity at the time. In response, the calculation module 303 may determine that the artificial light source will render a glare at the time, thereby obscuring the visibility of the road object. Conversely, the state of the of the artificial light source may be that the artificial light source is, at the time, activated and generating light at a low level of intensity or deactivated. In response, the calculation module 303 may determine that the road object will be obscured at the time due to lack of light.

In one embodiment, the calculation module 303 may receive from the detection module 301 a weather forecast data associated with a location of the road object and predict the visibility of the road object based further on the weather forecast data. The weather forecast data may indicate a weather condition that is affecting or has affected the location of the road object. For example, the weather forecast data may indicate air temperatures associated with the location of the road object at the time, as indicated by the temporal data. The air temperatures may indicate temperatures of the location with respect to different altitudes. Alternatively, the air temperatures of varying altitudes may be determined using a combination of the weather forecast data and readings generated from the sensors 207, where the reading may indicate the temperature of the lower altitude, and the weather forecast data may indicate the temperature of the higher altitude. If the light source is a natural light source, the calculation module 303 may determine the visibility of the road object as a function of both the sun angle/intensity and the air temperatures, thereby enabling the calculation module 303 to predict whether the road object will be obscured due to a mirage. In another example, the weather condition may be a precipitation associated with the location of the road object. If the light source is an artificial light source, the calculation module 303 may determine whether the precipitation will occur at the observation location at the time, as indicated by the temporal data, or the precipitation will occur at the observation location within a predetermined period that terminates at the time, as indicated by the temporal data. The predetermined period may be set based on an average amount of time that the precipitation takes to dissipate. If the precipitation occurs at the time or within the predetermined period, the calculation module 303 may determine the visibility of the road object as a function of both the state of the artificial light source and the precipitation associated with the location of the road object. Since the precipitation generally reflects the light propagating from the artificial light source to the road object (e.g., FIG. 1B), the calculation module 303 may predict the visibility of the road based on the state of the artificial light source and the precipitation.

In one embodiment, the calculation module 303 may receive road object attribute data from the detection module 301 and predict the visibility of the road object based further on the road object attribute data. The road object attribute data may be a type of road object, a shape of road object, a composition of road object, an orientation of road object, a color of road object, sign information displayed by road object, function associated with road object, a degree of difference or similarity between the road object and an object positioned at a peripheral of the road object, or a combination thereof. By way of example, the road object attribute data may indicate that the road object includes or is proximate to one or more light reflecting portions (e.g., reflective pavement markers), thereby enhancing the degree of obscurity when the road object is exposed to light at a certain angle/magnitude. By way of another example, the road object attribute data may indicate that a characteristic (e.g., color) of the road object (e.g., a road marking) is substantially similar to that of an object abutting the periphery of the road object (e.g., other portions of a road that is not a road marking), thereby enhancing the degree of obscurity when the road object is exposed to light.

In one embodiment, the calculation module 303 may receive from the detection module 301 information regarding one or more obstructing objects that is obstructing, or partially obstructing, light propagating from a light source and predict the visibility of the road object based further on the information. For example, the calculation module 303 may determine whether a static object, such as a point-of-interest (POV) or another road object (e.g., traffic light post, road sign, etc.), is proximate to the road object. The calculation module 303 may determine the location of the static object relative to the road object and calculate an orientation of a light source at the time indicated by the temporal data. The calculation module 303 may obtain attribute data associated with the static object, where the attribute data may indicate the shape of the static object. For a natural light source, temporal data may be used to determine the sun angle, and the calculation module 303 may determine whether the static object affects the visibility of the road object (e.g., by casting a shadow on the road object) based on the sun angle, the position/orientation of the static object, the shape of the static object, and the position/orientation of the road object. If the static object affects the visibility of the road object by obstructing, at least a portion of, the light propagated from the light source, the calculation module 303 defines the static object as the obstructing object. Since an image of the road object that is affected by both the shadow casted by the obstructing object and the light propagated from the natural light source varies in luminance, image sensors may be unable to identify the road object. As such, if the calculation module 303 calculates that the road object will be affected by both the shadow casted by the obstructing object and the light propagated from the natural light source at the time indicated by the temporal data, the calculation module 303 may predict that the road object will be obscured at the time. In one embodiment, the calculation module 303 may determine whether a static object is the obstructing object by using historical data, where the historical data include one or more images including the road object and the shadow casted by the static object over time.

In one embodiment, the obstructing object may be a dynamic object, such as another vehicle. In such embodiment, the calculation module 303 may: (1) acquire a travel link associated with the other vehicle; (2) estimate the current velocity of the other vehicle; (3) estimate the current velocity of the vehicle 205; and (4) determine whether the other vehicle will be the obstructing object at the time of which the vehicle 205 arrives at the observation location based on the travel link and the current velocities of the vehicle 205 and the other vehicle. In such embodiment, it is assumed that the other vehicle is communicatively coupled to the communication network 221, and the travel link associated with the other vehicle is acquired by the detection module 301 and provided to the calculation module 303 through the communication network 221. Alternatively, if: (1) the vehicle 205 and the other vehicle are within the same road segment/link; (2) the road object is within the road segment/link; and (3) the vehicle 205 and the other vehicle have yet to encounter the road object, the calculation module 303 may: (1) estimate the current velocity of the vehicle 205; (2) estimate the current velocity of the other vehicle; and (3)

determine whether the other vehicle will be the obstructing object at the time of which the vehicle 205 arrives at the observation location based on the current velocities of the vehicle 205 and the other vehicle. In such embodiment, the sensors 207 may acquire the velocity of the other vehicle or if the other vehicle is communicatively coupled to the communication network 221, the detection module 301 may acquire data indicating the velocity of the other vehicle from the other vehicle and provide the same to the calculation module 303. It is contemplated that a high density of traffic may increase the likelihood of one or more obstructing objects within the road environment including the road object. As such, the calculation module 303 may render a determination of whether the road object will be obscured at the time indicated by the temporal data based on traffic density information regarding a portion of the travel link or a road segment associated with the road object at the time indicated by the temporal data. For example, if: (1) the time indicated by the temporal data is within a night time period; (2) a precipitation has recently formed within the road environment including the road object; and (3) traffic density associated with the road environment is high, the calculation module 303 may determine that the road object will be likely to be obscured due to an amount of light generated by a number of vehicles within the road environment (e.g., headlights and taillights). Since a greater number of vehicles generates a greater amount of light, the likelihood of the light reflecting off the precipitation and obscuring the road object also increases. In one embodiment, the calculation module 303 may render the prediction of whether a dynamic object will affect light propagating from the light source at the time indicated by the temporal data based on a combination of the current and/or past measurements of the dynamic object and the traffic density information. Since the measurement associated with the dynamic object is not constant (e.g., speed and heading of another vehicle is subject to change at a future time), the combination provides greater confidence of whether a dynamic object will affect light propagating from the light source at the time indicated by the temporal data.

In one embodiment, the calculation module 303 may predict the visibility of the road object by selecting one of a plurality of brightness image histogram associated with the road object using the temporal data. Each of the plurality of brightness image histogram may be a brightness image histogram of an image including the road object and captured at the observation location. Each of the images may be captured at different past times and days. As such, the calculation module 303 may select the one of the plurality of brightness image histogram that corresponds to the time and day indicated in the temporal data. One or more pixel locations of each of the plurality of brightness image histogram may resemble a location of the road object within the image. As such, if the one or more brightness levels corresponding to the one or more pixel locations of the selected one of the plurality of brightness image histogram is at or greater than a threshold level, the calculation module 303 may predict that the road object is obscured due to a glare condition. In one embodiment, the calculation module 303 may receive sensor attribute data from the vehicle 205, where the sensor attribute data indicates position and/or orientation at which the sensors 207 are mounted on the vehicle 205. In such embodiment, the images captured at different past times and days may be associated with other sensor attribute data of other vehicle sensors. Since the way of which vehicle sensors are mounted on vehicles may be different, the calculation module 303 may compare the sensor attribute data of the sensors 207 and the sensors attribute data of other vehicle sensors such that images captured by the sensors 207 may be modified to be consistent with the images captured at different past times and days. Using such process, the one or more pixel locations resembling the location of the road object within the image captured by the sensors 207 and the images captured at different past times and days may be consistent, and the calculation module 303 may accurately predict the visibility of a road object for future instances by using the brightness image histograms of past times and days that are associated with the road object. It should be appreciated that the image captured by the sensors 207 may be cropped, warped, stretched, or rotated depending on the position/orientation of the sensors 207 with respect to the position/orientation of vehicle sensors that captured images at different past time and day. In one embodiment, the calculation module 303 may: (1) process a plurality of images captured at the observation location; (2) identify road boundaries within the plurality of images; and (3) generate the plurality of brightness image histogram only for the road boundaries within the plurality of images. Since the road object is generally expected to be within the road boundaries, generating a brightness image histogram for a portion of an image may improve the accuracy for identifying one or more pixel locations that correspond to the location of the road object and lower processing resources required for generating the plurality of brightness image histograms.

In one embodiment, the calculation module 303 may establish a confidence level for predicting the state of visibility for the road object. The confidence level may indicate the confidence of predicting the state of visibility for the road object. By way of example, if the calculation module 303 performs a prediction of the state of visibility for the road object at the time indicated by the temporal data without using historical data associated with the state of visibility for the road object (e.g., determining the visibility of the road object as a function of the the sun angle, the location of the road object, and weather data), the calculation module 303 may set the confidence level to a first level. If the calculation module 303 acquires historical data associated with the state of visibility for the road object at the time indicated by the temporal data and determines that the historical data validates the prediction, the calculation module 303 may set the confidence level to a second greater level. If the calculation module 303 further acquires a brightness image histogram that correspond to the time and date indicated by the temporal data, and the one or more brightness level corresponding to the one or more pixel locations of the bright image histogram exceeds a threshold level, the calculation module 303 may set the confidence level to a third greater level.

In one embodiment, the calculation module 303 may determine the state of visibility for the road object when sensor observation data received from a sensor (e.g., the sensors 207) indicate that the road object was not observed by the sensor. By way of example, the vehicle 205 may be expected to observe a road object with the sensors 207 at a given location. However, if the sensors 207 fail to observe the road object at the given location, the vehicle 205 may inform the detection module 301 that the sensors 207 have failed to observe the road object at the location. Using this information, the calculation module 303 may investigate to determine a reason as to why the sensors 207 have failed to observe the road object at the given location. To determine the reason, the calculation module 303 may acquire temporal data indicating a time of which the sensors 207 were expected to observe the road object. Using the temporal data, the calculation module 303 may identify contextual information associated with the temporal data (e.g., an orientation of a light source at the time or a state of one or more artificial light sources at the time). If the contextual information satisfies one or more conditions (e.g., the orientation of the light source is at a predetermined value or within a predetermined range or the one or more artificial light sources is activated), the calculation module 303 may determine that the sensors 207 have failed to observe the road object due a condition affecting visibility of the road object (e.g., a glare condition).

In one embodiment, the notification module 305 may cause a notification to the UE 201 on the state of visibility for the road object at the time (and date) indicated by the temporal data. In one embodiment, the notification may simply state that the road object will be obscured or slightly obscured at a time of which the vehicle 205 is estimated to encounter the road object. In one embodiment, the notification may state how the road object will be obscured (e.g., a glare condition rendered by the sun, building lights reflecting off the precipitation formed on the road object, etc.). In one embodiment, the notification may state the confidence level associated the prediction of the state of visibility for the road object. In one embodiment, the notification module 305 may cause the notification to one or more vehicles that is communicatively coupled to the communication network 221 and is about to encounter the road object. In one embodiment, the notification module 305 may cause an alarm notification if the state of visibility for the road object indicates obscurity. The one or more notification may include sound notification, display notification, vibration, or a combination thereof. In one embodiment, the notification module 305 may provide the notification to a local municipality associated with the road sign.

In one embodiment, the presentation module 307 obtains a set of information, data, and/or calculated results from other modules, and continues with providing a presentation of a visual representation to the UE 201. The visual representation may include: (1) the vehicle 205; (2) a travel link or a road segment/link on which the vehicle 205 is traversing; (3) a road object associated with the travel link or the road segment/link; (4) a visual indicator indicating a current state of visibility for the road object; (5) a visual indicator indicating a future state of visibility for the road object (e.g., state of visibility for the road object at the time of which the vehicle 205 is estimate to encounter the road object); (6) a visual indicator indicating a reason as to why the road object is obscured or will be obscured; (7) at least one alternate travel link that avoids the location including the road object with obscured visibility; (8) a future estimated time at which the road object will become unobscured; (9) a confidence level associated the prediction of the state of visibility for the road object; or (10) a combination thereof. In one embodiment, the presentation module 207 may provide the visual representation to one or more vehicle that are communicatively coupled to the communication network 221 and sharing the road segment/link of which the vehicle 205 is traversing. In one embodiment, the presentation module 307 may generate a map layer including any of the information presented by the visual representation. The map layer may include one or more elements that resembles states of vehicles, road objects, and light sources in real-time or future time.

In one embodiment, the training module 309 may embody one or more machine learning model for predicting the of visibility for the road object. The training module 309 may train a machine learning model to establish a parameter for predicting obscurity for a road object using historical data. For example, the parameter may indicate that a road object will be obscured at the observation location if the sun angle is 40 degrees. The historical data may include, for a past time or duration, an image captured by an image sensor (e.g., sensors 207) at an observation location and an indication that the image sensor has failed to identify the road object within the image due to one or more past conditions that is relevant for the past time or duration (e.g., weather condition, sun angle, obstructing object, state of one or more artificial light source proximate to the road object, etc.). Once the machine learning model is trained, the machine learning model may be applied to predict the visibility of a road object disposed in locations where historical data associated thereto are not available. In practice, the training module 309 may continuously train the machine learning model by receiving ground truth data. The ground truth data may be, for example, a probe data and indicate a true state of visibility for the road object at the observation location. If the ground truth data validates a prediction, the parameter may be maintained. If the ground truth data differs from the prediction, the parameter may be adjusted as a function past parameters and the ground truth data. By way of example, the machine learning model may be random forest, logistic, decision trees, neural networks, or a combination thereof.

The above presented modules and components of the prediction platform 223 can be implemented in hardware, firmware, software, or a combination thereof. Though depicted as a separate entity in FIG. 2A, it is contemplated that the prediction platform 223 may be implemented for direct operation by the UE 201, the vehicle 205, the services platform 215, one or more of the content providers 219, or a combination thereof. As such, the prediction platform 223 may generate direct signal inputs by way of the operating system of the UE 201, the vehicle 205, the services platform 215, the one or more of the content providers 219, of the combination thereof for interacting with the applications 203. The various executions presented herein contemplate any and all arrangements and models.

Figure 4:
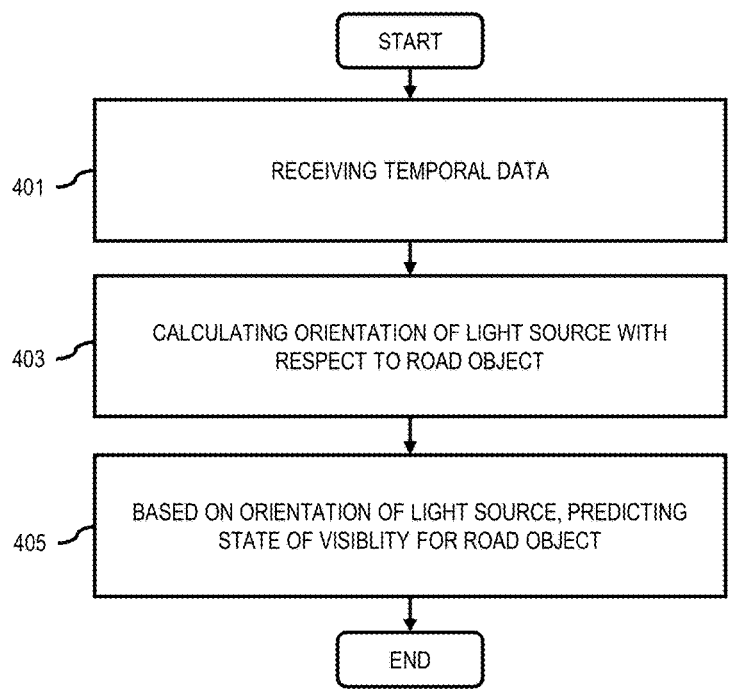
FIG. 4 illustrates a flowchart of a process for determining a state of visibility for a road object based on an orientation of a light source.
Figure 11:
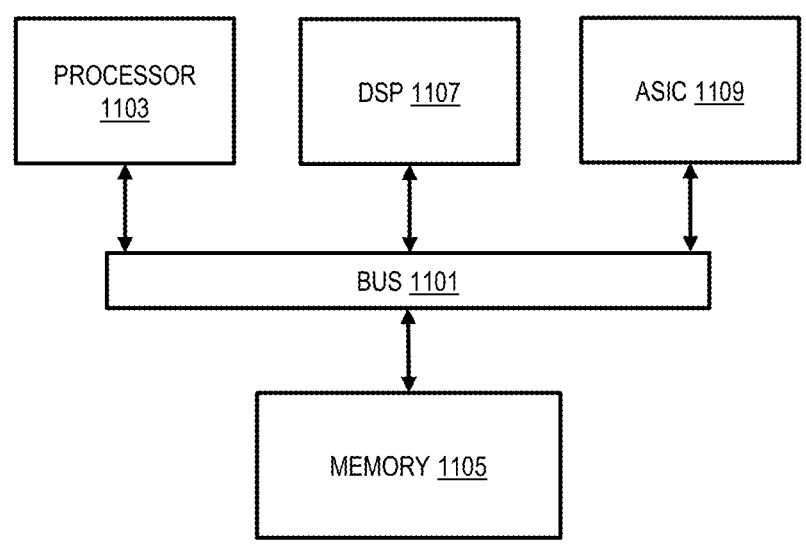
FIG. 11 illustrates a chip set or chip upon which an embodiment may be implemented.

FIG. 4 is a flowchart of a process 400 for determining a state of visibility for a road object based on an orientation of a light source, according to one embodiment. In one embodiment, the prediction platform 223 performs the process 400 and is implemented in, for instance, a chip set including a processor and a memory as shown in FIG. 11.

In step 401, the prediction platform 223 may receive temporal data. The temporal data may indicate a time at which the road object is estimated to be: (1) encountered by the vehicle 205; (2) within a detection range of the sensors 209; (3) within a field-of-view for a human driver of the vehicle 205; or (4) a combination thereof. Alternatively, the temporal data may be an arbitrary combination of time and date provided by a source (e.g., UE 201, vehicle 205, or other entity) that requests a prediction from the prediction platform 223. In one embodiment, the temporal data may further indicate a date corresponding to the time. When the temporal data are received, the prediction platform 223 may interpret the receipt of the temporal data as a request for rendering the prediction of the state of visibility for the road object at the time, as indicated by the temporal data. In one embodiment, the prediction platform 223 may acquire the temporal data when a user requests a navigational route to a destination via the UE 201 or a user interface provided within the vehicle 205. Specifically, the prediction platform 223 may detect a road object associated with a travel link and generate the temporal data by estimating a time and date of which the vehicle 205 is estimated to encounter the road object. In one embodiment, the prediction platform 223 may: (1) automatically detect a current road segment/link of which the vehicle 205 is traversing; (2) detect a road object within a portion of the road segment/link that the vehicle 205 has yet to traverse; and (3) determine the temporal data based on a time and date of which the vehicle 205 is estimated to be at an observation location for the road object.

In step 403, the prediction platform 223 calculates an orientation of a light source with respect to the road object using the temporal data. Specifically, the prediction platform 223 calculates the orientation of the light source with respect to the location at which the road object is disposed using the time and date indicated by the temporal data. In one embodiment, the orientation of the light source is a sun angle. The time indicated by the temporal data may be used to determine the angle of the sun with respect to the location of the road object for a given day. The date indicated by the temporal data may be used to determine a length of daytime period, which may also be used to determine the angle of the sun with respect to the location of the road object. For example, for a given time, an orientation of the light source corresponding to a colder seasonal period may be different than an orientation of the light source corresponding to a warmer seasonal period. As such, the orientation of the light source may be determined as a function of both time and date.

In step 405, the prediction platform 223 predicts the state of visibility for the road object based on the orientation of the light source. Specifically, if the orientation of the light source is within a threshold value or range (e.g., the sun angle is within 30-40 degrees), the prediction platform 223 may predict that a road object will be obscured for an observer (e.g., a passenger of the vehicle 205 and/or sensors 207) at the observation location due to a glare condition that is predicted to occur at the location of the road object.

Figure 5:
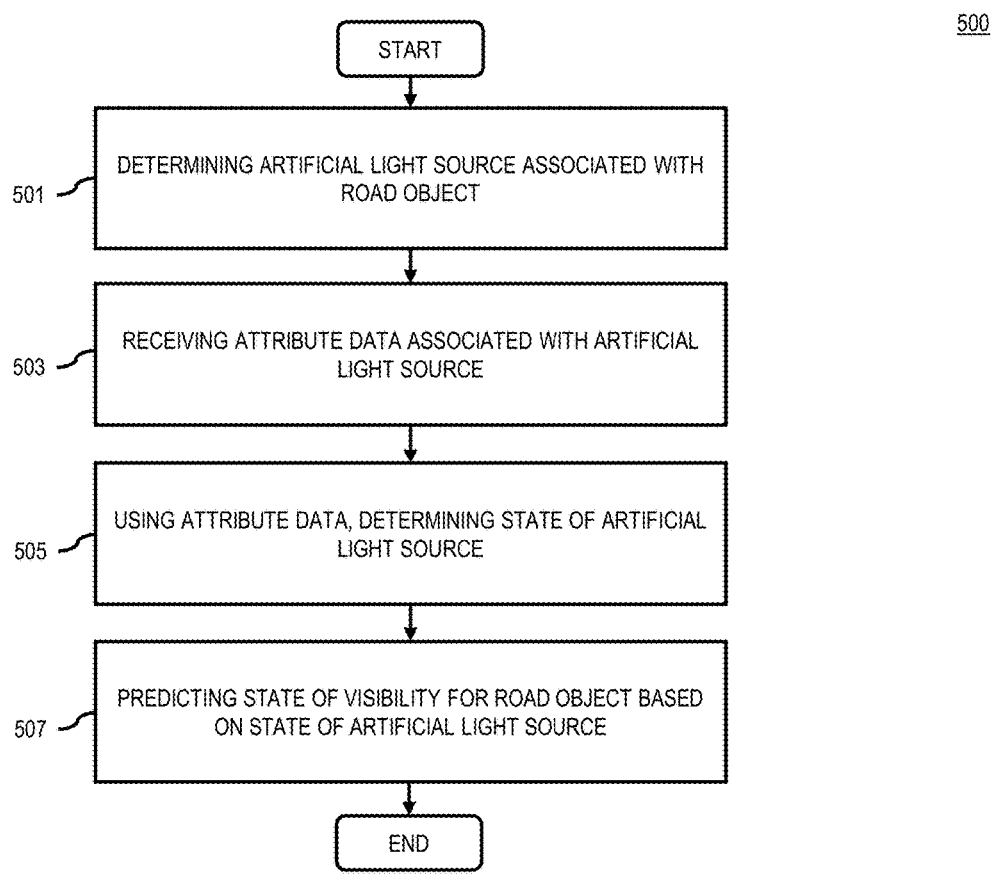
FIG. 5 illustrates a flowchart of a process for determining a state of visibility for a road object based on a state of an artificial light source.

FIG. 5 is a flowchart of a process 500 for determining a state of visibility for a road object based on a state of an artificial light source, according to one embodiment. In one embodiment, the prediction platform 223 performs the process 500 and is implemented in, for instance, a chip set including a processor and a memory as shown in FIG. 11.

In step 501, the prediction platform 223 determines whether an artificial light source is associated with a road object. The prediction platform 223 may determine that an artificial light source is associated with the road object when the artificial light source is within a predetermined distance from the road object. In one embodiment, if the artificial road object is within the predetermined distance from the road object, the prediction platform 223 may further determine a presence of an obstacle obstructing light propagating from the artificial light source to the road object. The prediction platform 223 may calculate whether the obstacle obstructs the light propagating from the light source based on: (1) the position of the road object; (2) the position of the artificial light source; and (3) the position of the obstacle. If the light propagating from light source is unobstructed or slightly obstructed by the obstacle, the prediction platform 223 may determine that the artificial light source is associated with the road object (i.e., the artificial light source affects the visibility of the road object the road object). Additionally or alternatively, to determine whether the artificial light source affects the visibility of the road object, the prediction platform 223 may receive and process historical data including one or more images of the road object and the artificial light source.

In step 503, if the artificial light source associated with the road object exists, the prediction platform 223 may acquire attribute data associated with the artificial light source from the database 225 (e.g., from the POI data records 2009 and other data records 2011). The attribute data may at least indicate a timing at which the artificial light generates light. In one embodiment, the attribute data may additionally indicate (1) one or more durations at which at which the artificial light source generates light at one or more levels of intensity; (2) one or more durations at which the artificial light source generates light as one or more colors; (3) an intensity at which the artificial light source generates light; or (4) a combination thereof.

In step 505, the prediction platform 223 may identify a state of the artificial light source using the attribute data, By way of example, the state of the of the artificial light source may be that the artificial light source is activated and/or generating light at a high level of intensity. Conversely, the state of the of the artificial light source may be that the artificial light source is deactivated or generating light at a low level of intensity.

In step 507, the prediction platform 223 may predict the state of visibility for the road object based on the state of the artificial light source. For example, if the state of the of the artificial light source is that the artificial light source is activated and/or generating light at a high level of intensity, the prediction platform 223 may determine that the artificial light source renders a glare condition, thereby obscuring the visibility of the road object for an observer (e.g., a passenger of the vehicle 205 and/or sensors 207) at the observation location. Conversely, the state of the artificial light source may be that the artificial light source is (1) activated and generating light at a low level of intensity; or (2) deactivated. In response, the prediction platform 223 may determine that the road object will be obscured due to lack of light.

Figure 6:
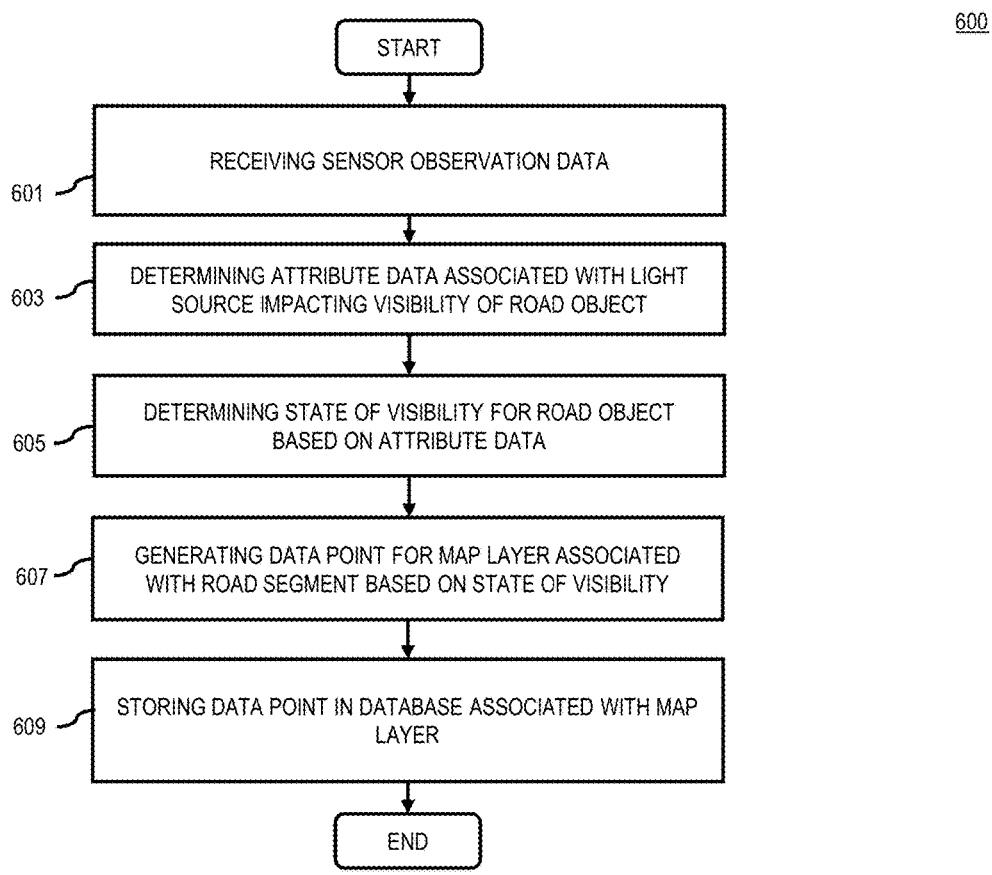
FIG. 6 illustrates a flowchart of a process for updating a map layer based a state of visibility of a road object.

FIG. 6 is a flowchart of a process 600 for updating a map layer based on a state of visibility of a road object, according to one embodiment. In one embodiment, the prediction platform 223 performs the process 600 and is implemented in, for instance, a chip set including a processor and a memory as shown in FIG. 11.

In step 601, the prediction platform 223 may receive sensor observation data from the vehicle 205. The sensor observation data may be sensor data acquired by the sensors 207 (e.g., data acquired by vehicle camera or lidar). In one embodiment, the prediction platform 223 may further receive temporal and spatial data associated with the sensor observation data. The temporal data may indicate one or more timestamps at which the sensors 207 collect data, and the spatial data may indicate one or more locations at which the sensors 207 collect data. At step 601, the vehicle 205 may be expected to observe a road object within a road segment.

In step 603, if the sensor observation data indicates that the sensors 207 have failed to observe the road object at a location that is expected to include the road object (e.g., as indicated by map data), the prediction platform 223 may determine attribute data associated with a light source that is affecting the visibility of the road object. The attribute data may indicate: (1) whether the light source is a natural light source or an artificial light source; (2) sun angle; (3) sun intensity; (4) presence of an obstructing object; (5) location/orientation of the artificial light source; (6) one or more timings at which the artificial light source generates light; (7) one or more durations at which at which the light source generates light at one or more levels of intensity; (8) one or more durations at which the light source generates light as one or more colors; (9) weather data associated with the location of the road object; (10) road attribute data associated with the road segment; or (11) a combination thereof. The attribute data may include one or more historical data and/or real-time data associated with the light source.

In step 605, the prediction platform 223 determines the state of visibility for the road object based on the attribute data. For example, the attribute data may indicate a sun angle, and if the sun angle is at a predetermined angle or within a predetermined range of angles, the prediction platform 223 may determine that the state of visibility for the road object is obscured due to a glare condition rendered at the observation location of the road object. In another example, the attribute data may indicate that a streetlight proximate to the road object is activated and precipitation has formed at the location of the road object. In such example, the prediction platform 223 may determine that the state of visibility for the road object is obscured due to light reflecting off the precipitation formed on the road object.

In step 607, the prediction platform 223 may generate a data point for a map layer associated with the road segment based on the state of visibility for the road object. The data point may indicate: (1) whether the road object is obscured or slightly obscured; (2) the reason as to why the road object is obscured; (3) a confidence level associated with the determination of the state of visibility; or (4) a combination thereof. The map layer may include one or more other data points that indicate one or more other states of visibility for one or more other road object within the road segment or one or more other road segments. The map layer may resemble a state of visibility for a road object at real time or at a future time.

In step 609, the prediction platform 609 stores the data point in the database 225 associated with the map layer. The may layer may be stored, wholly or partially, within the node data records 2003, the road segment data records 2005, the POI data records 2007, the road object records 2009, the other data records 2011, or a combination thereof.

Figure 7:
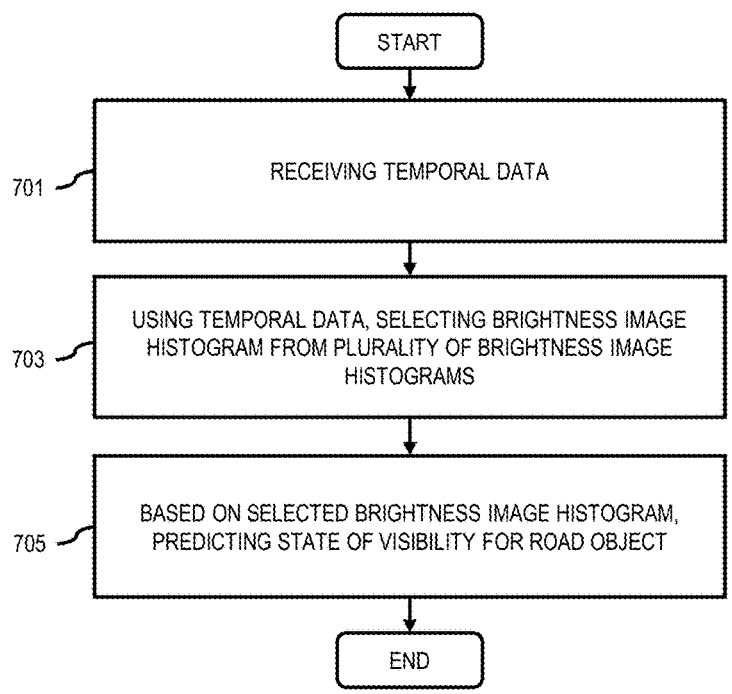
FIG. 7 illustrates a flowchart of a process for predicting a state of visibility for a road object using brightness image histograms.

FIG. 7 is a flowchart of a process 700 for predicting a state of visibility for a road object using brightness image histograms, according to one embodiment. In one embodiment, the prediction platform 223 performs the process 700 and is implemented in, for instance, a chip set including a processor and a memory as shown in FIG. 11.

In step 701, the prediction platform 223 may receive temporal data. The temporal data may indicate a time at which the road object is estimated to be: (1) encountered by the vehicle 205; (2) within a detection range of the sensors 207; (3) within a field-of-view for a human driver of the vehicle 205; or (4) a combination thereof. Alternatively, the temporal data may be an arbitrary combination of time and date provided by a source (e.g., UE 201, vehicle 205, or other entity) that requests a prediction from the prediction platform 223. In one embodiment, the temporal data may further indicate a date corresponding to the time. When the temporal data are received, the prediction platform 223 may interpret the receipt of the temporal data as a request for rendering the prediction of the state of visibility for the road object at the time, as indicated by the temporal data. In one embodiment, the prediction platform 223 may acquire the temporal data when a user requests a navigational route to a destination via the UE 201 or a user interface provided within the vehicle 205. Specifically, the prediction platform 223 may detect a road object associated with a travel link and generate the temporal data by estimating a time and date of which the vehicle 205 is estimated to encounter the road object. In one embodiment, the prediction platform 223 may: (1) automatically detect a current road segment/link of which the vehicle 205 is traversing; (2) detect a road object within a portion of the road segment/link that the vehicle 205 has yet to traverse; and (3) determine the temporal data based on a time and date of which the vehicle 205 is estimated to be at an observation location for the road object.

In step 703, the prediction platform 223 may select one of a plurality of brightness image histograms associated with the road object using the temporal data. Each of the plurality of brightness image histogram may be a brightness image histogram of an image including the road object and captured at the observation location. Each of the images may be captured at different past times and days. As such, the prediction platform 223 may select the one of the plurality of brightness image histograms that corresponds to the time and day indicated in the temporal data. One or more pixel locations of each of the plurality of brightness image histogram may resemble a location of the road object within the image.

In step 705, if the one or more brightness levels corresponding to the one or more pixel locations of the selected one of the plurality of brightness image histograms is at or greater than a threshold level, the prediction platform 223 may predict that the road object is obscured at the time indicated by the temporal data. The threshold level may indicate a condition at which the road object will be obscured due to, for example, a glare condition.

Figure 8:
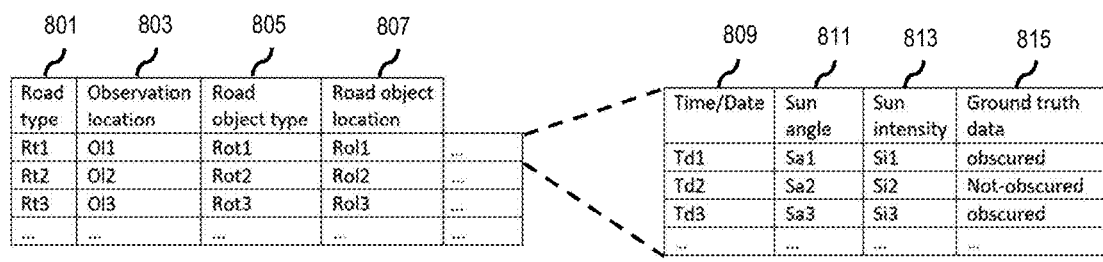
FIG. 8 illustrates an example table representing historical data used to train a machine learning model for predicting a state of visibility for a road object.

FIG. 8 is an example table 800 representing historical data used to train a machine learning model for predicting a state of visibility for a road object. The historical data includes, at least, data types that remain static through time, temporal data 809, data types that are dynamic through time, and ground truth data 815. In the illustrated example, the data types that remain static through time may include road type 801, observation location 803, road object type 805, and road object location 807. The data types that are dynamic through time may include sun angle 811 and sun intensity 813. In the illustrated example, the ground truth data 815 indicates "obscured" or "not-obscured." In certain embodiments, data types that remain static through time may also include obstructing object type, obstructing object location, artificial light source type, artificial light source location, artificial light source characteristics (e.g., type of light, intensity, etc.), road object characteristics, road characteristics, or a combination thereof. In certain embodiments, data types that are dynamic through time may include weather condition, artificial light source status, or a combination thereof. In one embodiment, a machine learning model, such as random forest, may be trained using the table 800. It should be appreciated that any number and/or type of data types that remain static through time and data types that are dynamic through time may be recorded for the ground truth data.

Figure 9:
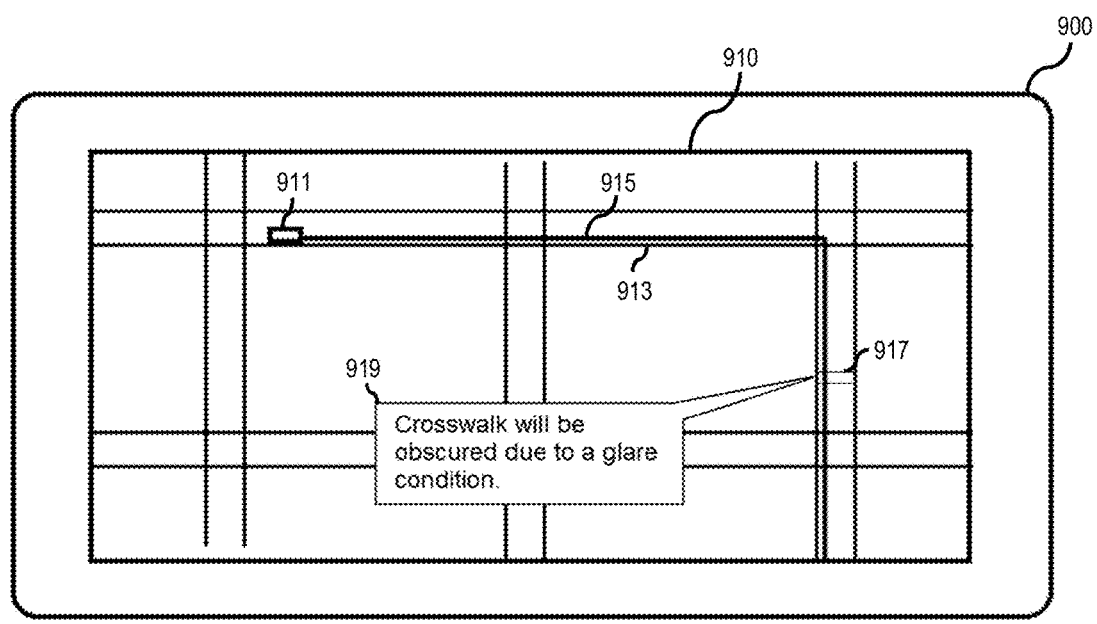
FIG. 9 illustrates an example user interface displaying a real-time map of an example scenario.

FIG. 9 is an example user interface 900 displaying a map 910 of an example scenario, according to one embodiment. In one embodiment, the user interface 900 may be a component of the UE 201 in FIG. 2A. The user interface 900 displays the 910 including a vehicle model 911 indicating the current location of the vehicle 205, road models 913 representing a road network, a travel link 915, a road object model 917 indicating a location of a road object and a type of road object, and a message 919. In the example scenario, the road object is a crosswalk, and the vehicle 205 has yet to encounter the crosswalk. The prediction platform 223 has estimated a time of which the vehicle is anticipated to encounter the crosswalk, and based on the time, the prediction platform 223 has estimated an orientation at which a light source will be affecting the crosswalk at the time. Based on the estimated orientation, the prediction platform 223 has determined that the crosswalk will be obscured at the time at which the vehicle 205 is estimated to encounter the crosswalk. Accordingly, the message indicates that "CROSSWALK WILL BE OBSCURED DUE TO A GLARE CONDITION." It should be appreciated that the message may further display other relevant information related to the prediction. For example, the message may further indicate: (1) a first time at which the glare condition will occur; (2) a second time at which the glare condition will subside; (3) a confidence level associated with the prediction; (4) or a combination thereof. The map 910 may include one or more elements that correspond to real-time and one or more elements that correspond to a future time. For example, one or more real-time elements may be the travel link 915, current traffic congestion, current state of visibility for one or more objects within the travel link 915, etc., and one or more elements corresponding to future time may be the ETA of the vehicle 205, future traffic congestion, predicted state of visibility for one or more object within the travel link 915, etc.

The system, apparatus, and methods described herein enable a map-based server/platform to predict a state of visibility for a road object by predicting a way of which a light source affects visibility of the road object, thereby improving map-based contents provided to consumers. Further, since operators of vehicles may be aware of an obscured road object prior to encountering said road object, the operators are supplied with ample amount of time for rendering a plan for encountering the obscured road object (e.g., avoiding the obscured road object, driving slowly at the location of the road object, waiting until the road object becomes unobscured, etc.). As such, the system, apparatus, and methods described herein enhances safety for those within the environment surrounding the road object.

The processes described herein may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
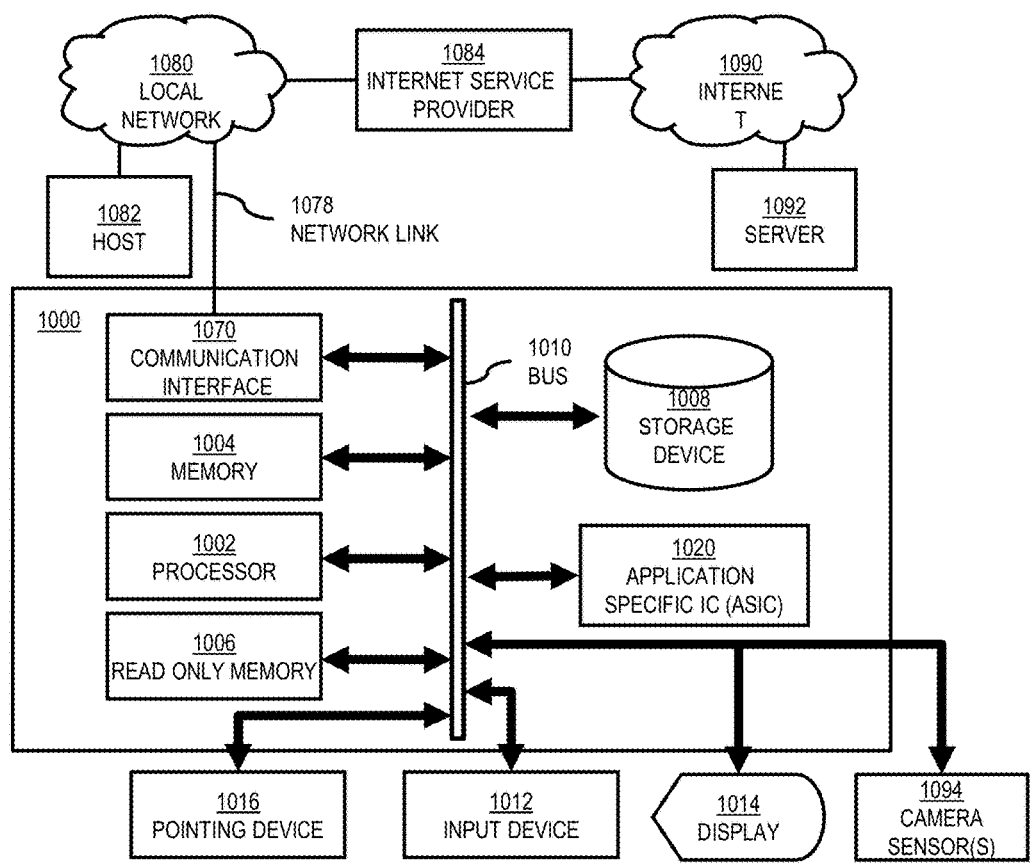
FIG. 10 illustrates a computer system upon which an embodiment may be implemented.

FIG. 10 illustrates a computer system 1000 upon which an embodiment may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to determine safety levels for one or more travel links based, at least in part, on signage information as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of determining safety levels for one or more travel links based, at least in part, on signage information.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to determining safety levels for one or more travel links based, at least in part, on signage information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for determining safety levels for one or more travel links based, at least in part, on signage information. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for determining safety levels for one or more travel links based, at least in part, on signage information, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 221 for determining safety levels for one or more travel links based, at least in part, on signage information to the UE 201.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1082 connected to the Internet hosts a process that provides a service in response to information received over the Internet. For example, server host 1082 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1082 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment may be implemented. Chip set 1100 is programmed to determine safety levels for one or more travel links based, at least in part, on signage information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of determining safety levels for one or more travel links based, at least in part, on signage information.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors. The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to determine safety levels for one or more travel links based, at least in part, on signage information. The memory 1105 also stores the data associated with or generated by the execution of the inventive steps.

Figure 12:
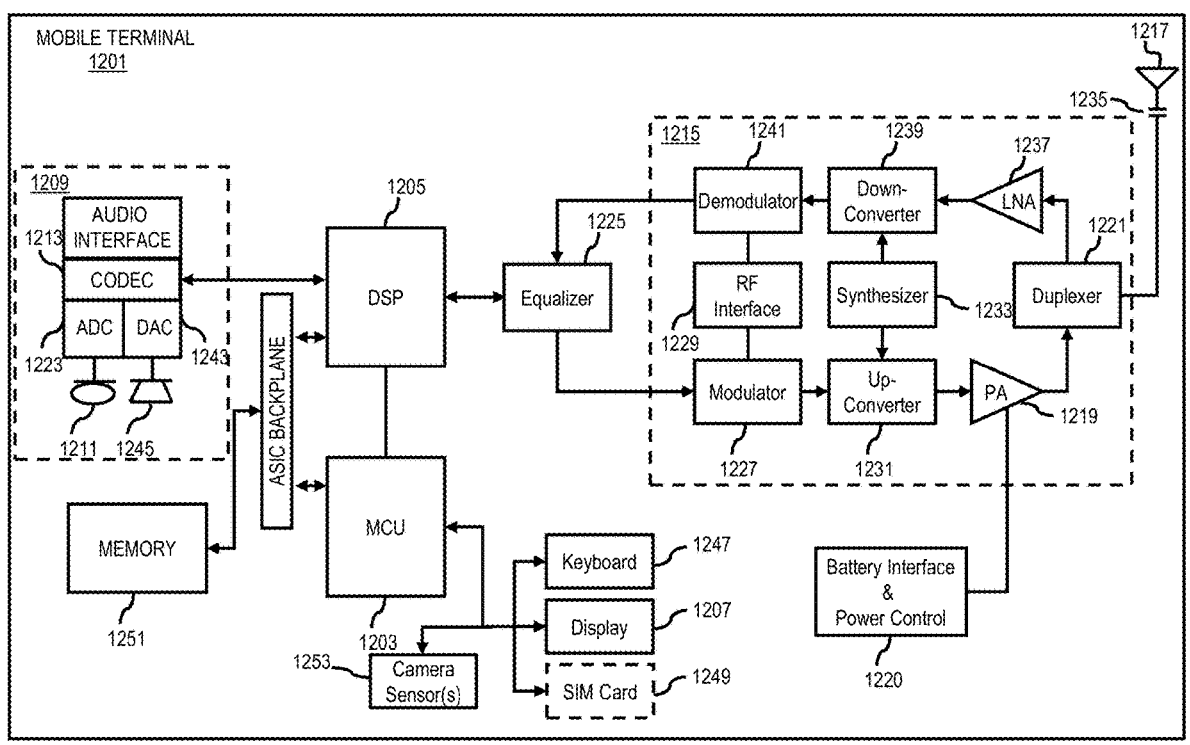
FIG. 12 illustrates a diagram of exemplary components of a mobile terminal for communications, which is capable of operating in the system of FIG. 2A.

FIG. 12 is a diagram of exemplary components of a mobile terminal 1201 (e.g., a mobile device or vehicle or part thereof) for communications, which is capable of operating in the system of FIG. 2A, according to one embodiment. In some embodiments, mobile terminal 1201, or a portion thereof, constitutes a means for performing one or more steps of determining safety levels for one or more travel links based, at least in part, on signage information. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of determining safety levels for one or more travel links based, at least in part, on signage information. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to determine safety levels for one or more travel links based, at least in part, on signage information. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

We claim:

1. A non-transitory computer-readable storage medium having computer program code instructions stored therein, the computer program code instructions, when executed by at least one processor, cause the at least one processor to:
   receive temporal data, wherein the temporal data indicates a time at which a vehicle is estimated to encounter the road object;
   using the temporal data, calculate an orientation of a light source with respect to a road object at the time at which the vehicle is estimated to encounter the road object, wherein the orientation of the light source is a sun angle;
   based on the orientation of the light source, predict a state of visibility for the road object, wherein the state of visibility indicates whether a user of the vehicle or a sensor of the vehicle will be able to observe the road object at the time; and
   (i) generate a travel link based on the state of visibility and cause the vehicle to traverse at least a portion of the travel link; (ii) based on the state of visibility, cause the vehicle to change usage of a first set of vehicle sensors to a second set of vehicle sensors at the time; (iii) based on the state of visibility, cause the vehicle to change from an autonomous mode to a manual mode or from the manual mode to an autonomous mode; or (iv) a combination thereof.

2. The non-transitory computer-readable storage medium of claim 1, wherein the computer program code instructions, when executed by at least one processor, cause the at least one processor to:
   receive road object attribute data indicating an attribute of the road object; and
   predict the state of visibility based further on the road object attribute data.

3. The non-transitory computer-readable storage medium of claim 2, wherein the attribute of the road object indicates a location of road object, a type of road object, a shape of road object, a composition of road object, an orientation of road object, a color of road object, sign information displayed by road object, function associated with road object, a degree of difference or similarity between the road object and an object positioned at a peripheral of the road object, or a combination thereof.

4. The non-transitory computer-readable storage medium of claim 1, wherein the road object is a first road object, and wherein the computer program code instructions, when executed by at least one processor, cause the at least one processor to:
   using map data and the orientation of the light source with respect to the road object, determine whether a static object proximate to the first road object exists, the static object being a second road object or a point-of-interest (POI); and
   responsive to the static object existing, predict the state of visibility for the road object based further on whether the static object affects light propagation from the light source to the road object at the orientation of the light source.

5. The non-transitory computer-readable storage medium of claim 1, wherein the vehicle is a first vehicle, and wherein the computer program code instructions, when executed by at least one processor, cause the at least one processor to:
   using location data and the orientation of the light source with respect to the road object, determine whether a second vehicle proximate to the road object exists; and
   responsive to the second vehicle existing, predict the state of visibility for the road object based further on whether the second vehicle affects light propagation from the light source to the road object at the orientation of the light source.

6. The non-transitory computer-readable storage medium of claim 1, wherein the computer program code instructions, when executed by at least one processor, cause the at least one processor to:
   receive weather forecast data indicating a weather forecast of a location in which the road object is disposed; and
   predict the state of visibility based further on the weather forecast data.

7. The non-transitory computer-readable storage medium of claim 6, wherein the weather forecast data includes a forecasted precipitation type, a forecasted precipitation intensity, a forecasted air temperature, a forecasted precipitation rate, a forecasted cloud type, a forecasted wind direction, or a combination thereof.

8. The non-transitory computer-readable storage medium of claim 1, wherein the computer program code instructions, when executed by at least one processor, cause the at least one processor to:
   determine an observation location, the observation location being a location at which the road object is estimated to be observed by a vehicle sensor, a vehicle operator, or a combination thereof; and
   predict the state of visibility based on a perspective of the observation location.

9. The non-transitory computer-readable storage medium of claim 1, wherein the road object is a road marking.

10. The non-transitory computer-readable storage medium of claim 1, wherein, to predict the state of visibility for the road object, the computer program code instructions, when executed by at least one processor, cause the at least one processor to input the orientation of the light source to a machine learning model, wherein the machine learning model is trained using historical data, the historical data including, for each of at least one past time:
    the orientation of the light source or other orientation of the light source with respect to the road object; and
    for the orientation of the light source or the other orientation of the light source, a ground truth data indicating a true state of visibility for the road object.

11. An apparatus comprising at least one processor and at least one non-transitory memory including computer program code instructions, the computer program code instructions configured to, when executed, cause the apparatus to:
  determine an artificial light source proximate to a road object;
  receive attribute data associated with the artificial light source from a database, wherein the attribute data indicates one or more timings at which the artificial light source generates light;
  using the attribute data, predict a state of visibility for the road object, wherein the state of visibility indicates whether a user of a vehicle or a sensor of the vehicle will be able to observe the road object at a time at which: (i) the vehicle is estimated to encounter the road object; and (ii) the artificial light source generates light, wherein the artificial light source is separate from the vehicle; and
  (i) generate a travel link based on the state of visibility and cause the vehicle to traverse at least a portion of the travel link; (ii) based on the state of visibility, cause the vehicle to change usage of a first set of vehicle sensors to a second set of vehicle sensors at the time; (iii) based on the state of visibility, cause the vehicle to change from an autonomous mode to a manual mode or from the manual mode to an autonomous mode; or (iv) a combination thereof.

12. The apparatus of claim 11, wherein the attribute data further indicates one or more durations at which at which the artificial light source generates light at one or more levels of intensity, one or more durations at which the artificial light source generates light as one or more colors, or a combination thereof.

13. The apparatus of claim 11, wherein the instructions, when executed, further cause the apparatus to:
  receive weather forecast data indicating a weather forecast of a location in which the road object is disposed; and
  predict the state of visibility based further on the weather forecast data.

14. The apparatus of claim 11, the artificial light source being a street light, a building light, or a combination thereof.

15. A method comprising:
  receiving sensor observation data;
  responsive to the sensor observation data indicating that a road object of a road segment was not observed by a sensor, determining attribute data associated with a light source affecting visibility of the road object, wherein the attribute data indicates a sun angle with respect to the road object;
  determining a state of visibility for the road object based on the sun angle;
  generating a data point for the map layer associated with the road segment based on the state of visibility;
  storing the data point in a database associated with the map layer, wherein the map layer comprises the data point and one or more other data points that indicate one or more other states of visibility for one or more other road objects associated with the road segment, one or more other road segments, or a combination thereof; and
  responsive to receiving an indication that a user of a vehicle is designated to traverse the road segment, (i) generating a travel link based on the road segment and causing the vehicle to traverse at least a portion of the travel link; (ii) causing the vehicle to change usage of a first set of vehicle sensors to a second set of vehicle sensors; (iii) causing the vehicle to change from an autonomous mode to a manual mode or from the manual mode to an autonomous mode; or (iv) a combination thereof.

* * * * *